US009467856B2

(12) United States Patent
Hawkes et al.

(10) Patent No.: US 9,467,856 B2
(45) Date of Patent: *Oct. 11, 2016

(54) SECURE MECHANISM FOR OBTAINING AUTHORIZATION FOR A DISCOVERED LOCATION SERVER

(71) Applicant: QUALCOMM Incorporated, San Diego, CA (US)

(72) Inventors: Philip Michael Hawkes, Warimoo (AU); Andreas Klaus Wachter, Menlo Park, CA (US); Kirk Allan Burroughs, Alamo, CA (US); Stephen William Edge, Escondido, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/754,473

(22) Filed: Jun. 29, 2015

(65) Prior Publication Data

US 2015/0373540 A1    Dec. 24, 2015

Related U.S. Application Data

(63) Continuation of application No. 13/762,231, filed on Feb. 7, 2013, now Pat. No. 9,100,388.

(60) Provisional application No. 61/597,704, filed on Feb. 10, 2012.

(51) Int. Cl.
*H04L 29/06* (2006.01)
*H04W 12/06* (2009.01)
(Continued)

(52) U.S. Cl.
CPC ............. *H04W 12/06* (2013.01); *H04L 63/08* (2013.01); *H04L 63/0884* (2013.01); *H04L 63/102* (2013.01); *H04L 63/107* (2013.01); *H04W 4/20* (2013.01); *H04W 12/08* (2013.01)

(58) Field of Classification Search
CPC . H04L 63/08; H04L 63/0884; H04L 63/107; H04W 12/06; H04W 12/08; H04W 4/20
USPC ........................... 455/456.1; 726/4; 380/270
See application file for complete search history.

(56) References Cited

U.S. PATENT DOCUMENTS

2003/0236982 A1   12/2003  Hsu
2006/0225090 A1   10/2006  Shim et al.
(Continued)

FOREIGN PATENT DOCUMENTS

EP          1773076 A1    4/2007
JP        2008536377 A    9/2008
(Continued)

OTHER PUBLICATIONS

International Search Report and Written Opinion—PCT/US2013/025447—ISA/EPO—May 28, 2013.
(Continued)

*Primary Examiner* — John B King
(74) *Attorney, Agent, or Firm* — Kilpatrick Townsend & Stockton LLP

(57) ABSTRACT

Methods and apparatuses are presented for use in a terminal to access a discovered location server. The methods may include in response to a determination that a first network does not support authenticated access from the terminal to a home location server, obtaining authenticated access to the home location server using a second network that does support authenticated access to the home location server by the terminal. In response to obtaining authorization for the discovered location server from the home location server, the terminal may access the discovered location server using the first network.

16 Claims, 10 Drawing Sheets

(51) Int. Cl.
*H04W 4/20* (2009.01)
*H04W 12/08* (2009.01)

(56) References Cited

U.S. PATENT DOCUMENTS

| | | |
|---|---|---|
| 2008/0014962 A1 | 1/2008 | Shim |
| 2008/0133762 A1 | 6/2008 | Edge et al. |
| 2008/0254809 A1 | 10/2008 | Kraufvelin et al. |
| 2011/0207469 A1 | 8/2011 | Hinds et al. |
| 2012/0131329 A1 | 5/2012 | Liang et al. |
| 2013/0212649 A1 | 8/2013 | Hawkes et al. |

FOREIGN PATENT DOCUMENTS

| | | |
|---|---|---|
| JP | 2009517916 A | 4/2009 |
| WO | WO-2010130121 A1 | 11/2010 |
| WO | WO-2011041888 A1 | 4/2011 |

OTHER PUBLICATIONS

Open Mobile Alliance: "Secure User Plane Location Architecture, Draft Version 3.0", Jan. 3, 2011, pp. 1-40.
Tcs Systems: "SLP Discovery Models and Mechanisms", Dec. 15, 2010, 12 pages.

SECURE MECHANISM FOR OBTAINING AUTHORIZATION FOR A DISCOVERED LOCATION SERVER

CROSS REFERENCE TO RELATED APPLICATIONS

This application is a Continuation of U.S. non-provisional application Ser. No. 13/762,231, filed Feb. 7, 2013, and titled "SECURE MECHANISM FOR OBTAINING AUTHORIZATION FOR A DISCOVERED LOCATION SERVER" which claims the benefit of U.S. Provisional Patent Application No. 61/597,704, filed Feb. 10, 2012, and titled "SECURE MECHANISM FOR OBTAINING D-SLP AUTHORIZATION," the disclosure of which is hereby incorporated herein by reference in its entirety.

BACKGROUND

As services related to the location of mobile devices become more widespread, location solutions and associated location servers that enable and assist such location solutions are becoming more widely deployed. One example of such a location solution is the Secure User Plane Location (SUPL) solution defined by the Open Mobile Alliance (OMA) in publicly available documents. Another example is the Control Plane (CP) location solution defined by the $3^{rd}$ Generation Partnership Project (3GPP) in publicly available documents. Due to the ever increasing prevalence of mobile devices, location servers can sometimes restrict a user's ability to obtain access the location server without some form of authentication or authorization. Thus, services provided by the location server may not be readily available to visiting mobile devices at first.

SUMMARY

These problems and others may be solved according to embodiments of the present invention, described herein.

In some embodiments, a method is presented for use in a terminal to access a discovered location server. The method may include, in response to a determination that a first network does not support authenticated access to a home location server by the terminal, obtaining authenticated access to home location server using a second network that does support authenticated access to the home location server by the terminal. In response to obtaining authorization for the discovered location server from the home location server the terminal may then access the discovered location server using the first network.

In some embodiments, the discovered location server includes a discovered SUPL location platform (D-SLP). In some embodiments, the home location server includes a home SUPL location platform (H-SLP). In some embodiments, access obtained from the H-SLP is based, at least in part, via an alternative client authentication (ACA) mechanism, a device certificate, a Generic Bootstrapping Architecture (GBA), a public key certificate, or some combination thereof.

In some embodiments, the first network is a wireless local area network (WLAN). In some embodiments, the second network is a network that supports Long Term Evolution (LTE), WCDMA, GSM, cdma2000 HRPD, or a combination thereof.

In some embodiments, a terminal for accessing a discovered location server is presented. The terminal may include a processor configured to, in response to a determination that a first network does not support authenticated access to a home location server by the terminal, obtain authenticated access to the home location server using a second network that does support authenticated access to the home location server by the terminal. The processor may also be configured to, in response to obtaining authorization for the discovered location server from the home location server, access the discovered location server using the first network.

In some embodiments, an apparatus is presented for accessing a discovered location server. The apparatus may include means for, in response to a determination that a first network does not support authenticated access to a home location server by a terminal, obtaining authenticated access to the home location server using a second network that does support authenticated access to the home location server by the terminal. The apparatus may also include, in response to obtaining authorization for the discovered location server from the home location server, means for accessing the discovered location server using the first network.

In some embodiments, a non-transitory processor-readable medium is presented. The processor-readable medium may include processor-readable instructions configured to cause a processor to, in response to a determination that a first network does not support authenticated access to a home location server by a terminal obtain authenticated access to the home location server using a second network that does support authenticated access to the home location server by the terminal, and access the discovered location server using the first network.

In some embodiments, a method is presented for obtaining authorized access from a terminal to a secure user plane location (SUPL) platform. The method may include switching from a first network that does not support authentication of the terminal to a second network that does support authentication of the terminal Authenticated access to a first SUPL platform may be obtained using the second network. Authorization for a second SUPL platform may then be obtained from the first SUPL platform. The terminal may then switch from the second network back to the first network. The terminal may then access the second SUPL platform using the first network based on the obtained authorization from the first SUPL platform.

In some embodiments, an apparatus is presented. The apparatus may include one or more communication modules configured to access a first network and a second network. The apparatus may be configured to access a first secure user plane location platform using the first network and to access a second secure user plane location platform using the second network. The first secure user plane location platform may comprise a home secure user plane location (SUPL) location platform (H-SLP) and/or the second secure user plane location platform may comprise a discovered secure user plane location (SUPL) location platform (D-SLP). The apparatus may be configured to attempt access to the H-SLP using the second network, and to access the H-SLP using the first network if access to the H-SLP over the second network fails.

BRIEF DESCRIPTION OF THE DRAWINGS

An understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
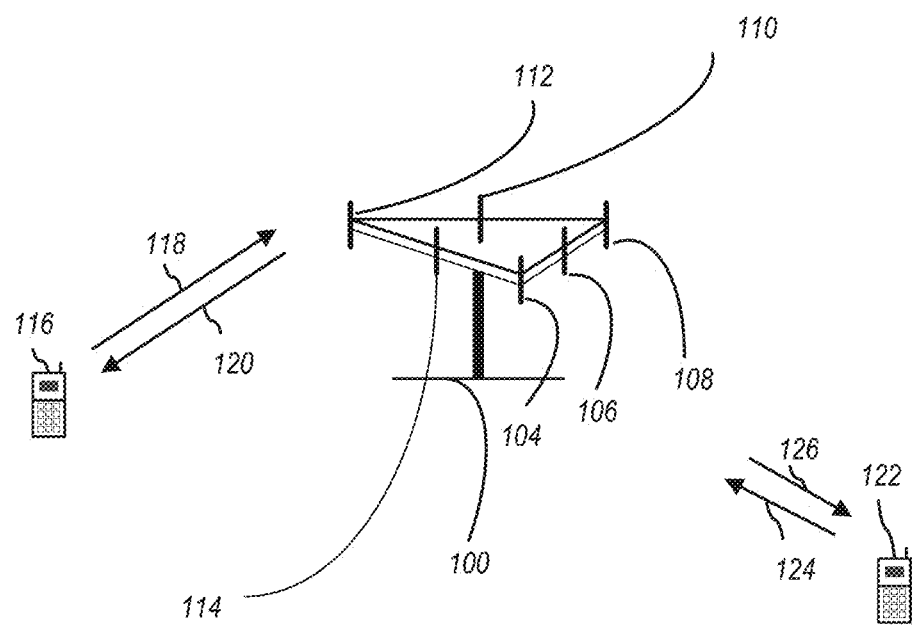
FIG. 1 is a graphical illustration of an example wireless network environment that can be employed in conjunction with the various systems and methods described herein.

The word "exemplary" is used herein to mean "serving as an example, instance, or illustration." Any embodiment or design described herein as "exemplary" is not necessarily to be construed as preferred or advantageous over other embodiments or designs.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), CDMA2000, etc. UTRA includes Wideband-CDMA (W-CDMA) and Low Chip Rate (LCR). CDMA2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA is part of Universal Mobile Telecommunication System (UMTS). Long Term Evolution (LTE) uses E-UTRA. UTRA, E-UTRA, GSM, UMTS and LTE are described in documents from 3GPP. CDMA2000 is described in documents from an organization named "3rd Generation Partnership Project 2" (3GPP2). These various radio technologies and standards are known in the art.

Single carrier frequency division multiple access (SC-FDMA), which utilizes single carrier modulation and frequency domain equalization is a technique. SC-FDMA may have similar performance and overall complexity as those of OFDMA system. SC-FDMA signal may have lower peak-to-average power ratio (PAPR) because of its inherent single carrier structure. SC-FDMA has drawn great attention, especially in the uplink communications where lower PAPR greatly benefits the mobile terminal in terms of transmit power efficiency. It is currently a working assumption for uplink multiple access scheme in 3GPP Long Term Evolution (LTE), or Evolved UTRA.

Various embodiments are described herein in connection with an access terminal An access terminal can also be called a system, subscriber unit, subscriber station, mobile station, mobile, remote station, remote terminal, mobile device, user terminal, terminal, wireless communication device, user agent, user device, user equipment (UE) or, in the case that SUPL is supported, a SUPL Enabled Terminal (SET). An access terminal can be a cellular telephone, a cordless telephone, a Session Initiation Protocol (SIP) phone, a wireless local loop (WLL) station, a personal digital assistant (PDA), a handheld device having wireless connection capability, a computing device, a smartphone, a tablet, a laptop or other processing device connected to or containing a modem, for example a wireless modem. Moreover, various embodiments are described herein in connection with a base station. A base station can be utilized for communicating with access terminal(s) and can also be referred to as an access point, Node B, Evolved Node B (eNodeB), access point base station, a WiFi access point, a Femtocell, a Home Base Station, a Home Node B, a Home evolved Node B or some other terminology.

Referring to FIG. 1, a multiple access wireless communication system according to some embodiments is illustrated. In one embodiment, an access point (AP) 100 includes multiple antenna groups, one including 104 and 106, another including 108 and 110, and an additional including 112 and 114. In FIG. 1, only two antennas are shown for each antenna group, however, more or fewer antennas may be utilized for each antenna group. For example, only one or two total antennas may be included or attached to the AP 100. Access terminal 116 (AT) is in communication with antennas 112 and 114, where antennas 112 and 114 transmit information to access terminal 116 over forward link 120 and receive information from access terminal 116 over reverse link 118. Examples of ATs may include SETs, mobile phones, PDAs, wireless tablets, and the like. Access terminal 122 is in communication with antennas 106 and 108, where antennas 106 and 108 transmit information to access terminal 122 over forward link 126 and receive information from access terminal 122 over reverse link 124. In a Frequency Division Duplex (FDD) system, communication links 118, 120, 124 and 126 may use different frequency for communication. For example, forward link 120 may use a different frequency than that used by reverse link 118.

Each group of antennas and/or the area in which they are designed to communicate may be referred to as a sector of the access point. In the embodiment, antenna groups each are designed to communicate to access terminals in a sector of the areas covered by access point 100.

In communication over forward links 120 and 126, the transmitting antennas of access point 100 may utilize beamforming in order to improve the signal-to-noise ratio of forward links for the different access terminals 116 and 122. Also, an access point using beamforming to transmit to access terminals scattered randomly through its coverage may cause less interference to access terminals in neighboring cells than an access point transmitting through a single antenna to all its access terminals. In some embodiments, beamforming is not performed.

Other access points or transmitting stations may be employed. For example, a base station may be used in addition to or instead of the AP 100. In some embodiments, a first transmitter such as the AP 100 may provide access to a first network while a second transmitter, for example a cellular base station, may provide access to a second network. In some embodiments, the areas in which each of the first transmitter and second transmitter may be accessed overlap.

Figure 2:
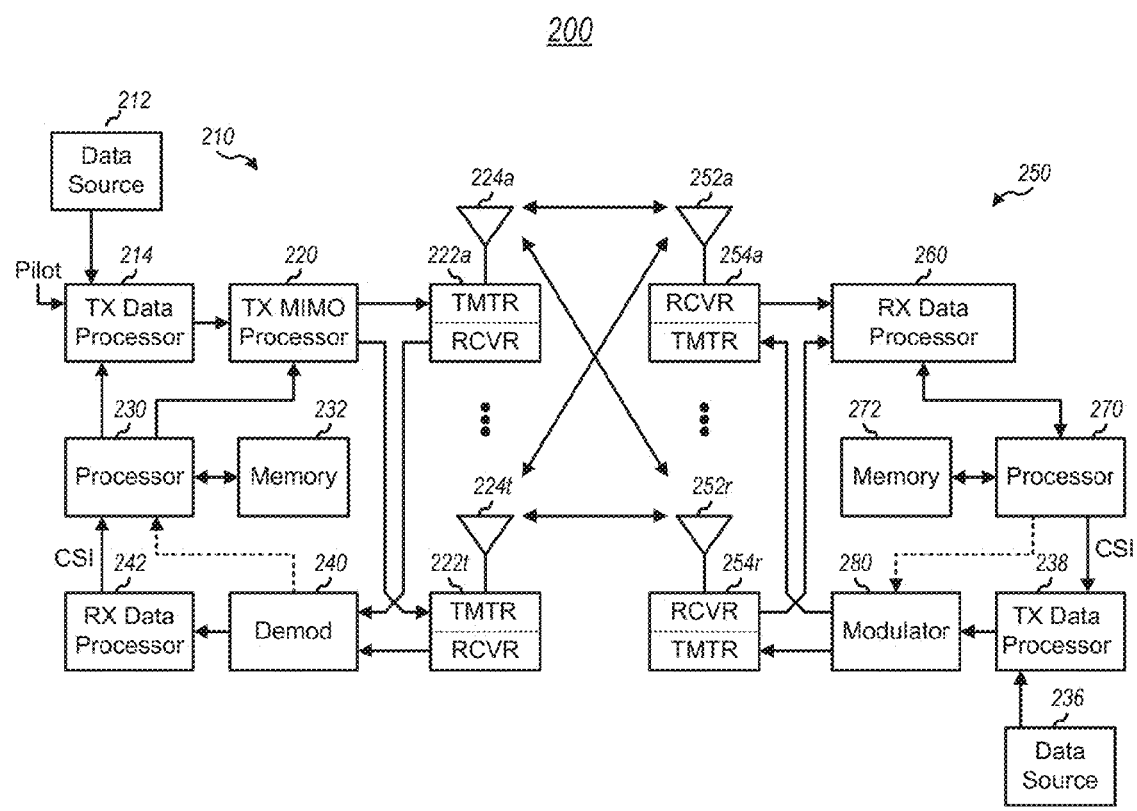
FIG. 2 illustrates exemplary apparatuses of various embodiments.

FIG. 2 is a block diagram of an embodiment of a transmitter system 210 (which may, for example, implement the access point 100) and a receiver system 250 (which may, for example, implement the access terminal 116) in a MIMO system 200. It should be noted however, that while an example MIMO system 200 is described, MIMO is not used in some embodiments, as other systems may be used (e.g. SISO, MISO, SIMO, etc.). At the transmitter system 210, traffic data for a number of data streams is provided from a data source 212 to a transmit (TX) data processor 214.

In some embodiments, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides NT modulation symbol streams to NT transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. NT modulated signals from transmitters 222a through 222t are then transmitted from NT antennas 224a through 224t, respectively.

At receiver system 250, the transmitted modulated signals are received by NR antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the NR received symbol streams from NR receivers 254 based on a particular receiver processing technique to provide NT "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically may determine which pre-coding matrix to use. Processor 270 may formulate a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210. Two or more receiver, transmitter, and antenna groups may be configured to access separate networks, for example a WLAN network and an LTE, WCDMA, or cdma2000 HPRD network. In some embodiments, a single receiver, transmitter, and antenna group may be configured to access at least two separate networks. Similarly, a plurality of processors may be included to process communications and/or data for a plurality of networks. Further, a single processor may be configured to process communications and/or data for a plurality of networks.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Apparatuses, methods, systems and computer-readable media for obtaining secure connections to a discovered location server are presented. As services related to the location of mobile devices become more widespread, location solutions and associated location servers that enable and assist such location solutions are becoming more widely deployed. One example of such a location solution is the SUPL solution defined by the OMA. Another example is the CP location solution defined by 3GPP. In the case of the SUPL location solution and certain other location solutions—e.g. ones defined by the Internet Engineering Task Force (IETF)—location servers can sometimes be restricted to supporting the location of mobile devices in small or medium sized geographic areas (e.g. a shopping mall, airport, town or city). In such cases, a location server may need to first be discovered by a mobile device and then authorized for use by some trusted entity such as a mobile device's home network or a home network location server. A potential problem in this case may be an inability to obtain access to the home network or home network location server in a way that allows the home network or home network location server to authenticate the mobile device before providing or authorizing the addresses of one or more local location servers authorized to provide location services to the mobile device. This problem may particularly apply when a mobile device uses some local intranet (e.g. a WiFi network) to access a local location server as the local intranet may not allow access or authenticated access to the mobile device's home network or home network location server.

According to some embodiments, to illustrate these and other problems, an access terminal (AT), e.g. a mobile device and/or the AT 116, may discover a location server that is accessible over some network A that the AT is currently using. For example, the address of the location server may be provided (e.g. broadcast) by base stations and access points, e.g., the AP 100, belonging to the network A and thus be freely accessible to the AT. Alternatively, the AT may query some entity in network A for the address (e.g. may perform a query using the IETF Dynamic Host Configuration Protocol (DHCP)) or the AT may be provided with the address on attachment to network A or may be provided with the address by some other means. The AT may wish to access the discovered location server for various reasons, including for location services, rather than any home location server that the AT may have. This may be because the discovered location server may provide better services in the particular area in which the AT is currently located (e.g. the AT may be roaming in a remote area from the home server, or is inside a building or other structure for which the home server has little or no information), or for any other reason of a variety of reasons. Before accessing the discovered location server, the AT may need to have the discovered location server authorized by the home location server, for example, in order to comply with standards bodies and to ensure that the discovered location server may be trusted by the AT to provide the services and to not provide unauthorized access or information of the AT to other parties. In addition, the AT may receive information from its home location server (e.g. security certificates) before accessing the discovered location server to enable the discovered location server to authenticate the AT and thereby reliably bill the AT user or home network for any services, if such a commercial arrangement has been set up.

However, it may not be possible or may be difficult for the AT to access its home location server using network A. For example, network A may be an internal intranet for some organization or venue and have no access to a public network or network A may have access to a public network and enable the AT to communicate with its home location server, but the home location server may not be able to authenticate the AT. For example, if network A is a wireless local area network (WLAN) with public network access, the IP address of the AT may be assigned by the WLAN and would not be known to or verifiable by the home location server or to the AT user's home network. This could mean that any authentication mechanism typically used to authenticate the AT may not be able to be used by the home location server to authenticate the AT and the home location server might then reject any request for authorization of the discovered location server received from the AT. An example of such an authentication mechanism used by the SUPL solution and defined by OMA is known as Alternative Client Authentication (ACA) and makes use of an ability by a home location server, known as a home SUPL Location Platform (H-SLP), to associate a public IP address of a SET with a unique global identity of the SET such as a Mobile Station Integrated Services Digital Network (MSISDN) number or an International Mobile Subscriber Identity (IMSI). Further, conditions of network A may prevent the AT from accessing the home location server. For example, network A, the AT's home network or intermediate routers, gateways or networks may place restrictions on communication with the AT's home network or the AT may not be authorized in network A for such communication. Alternatively, network A may be congested or otherwise have low bandwidth availability, presenting the AT with too many interruptions, delays, or collisions. In addition, it may not be possible for the AT to authenticate the home location server if the authentication method to be used relies on some support from the AT's home network.

To solve these problems, the AT may tune away from network A to another network B (e.g. an LTE, WCDMA or cdma2000 High Rate Packet Data (HRPD) network) that allows communication with the home location server and enables authentication of the AT by the home location server. For example, authentication mechanisms may be used by a home location server in some embodiments when an AT accesses it from an LTE, WCDMA or HRPD network because the home server can verify the AT identity from the IP address the AT uses to access the home server. This verification can be possible because the home network of the AT can be aware of the IP address assigned to the AT (e.g. from an association with a global address for an AT such as an IMSI or MSISDN) or can query for the AT identity (e.g. IMSI or MSISDN) knowing the IP address.

Figure 3A:
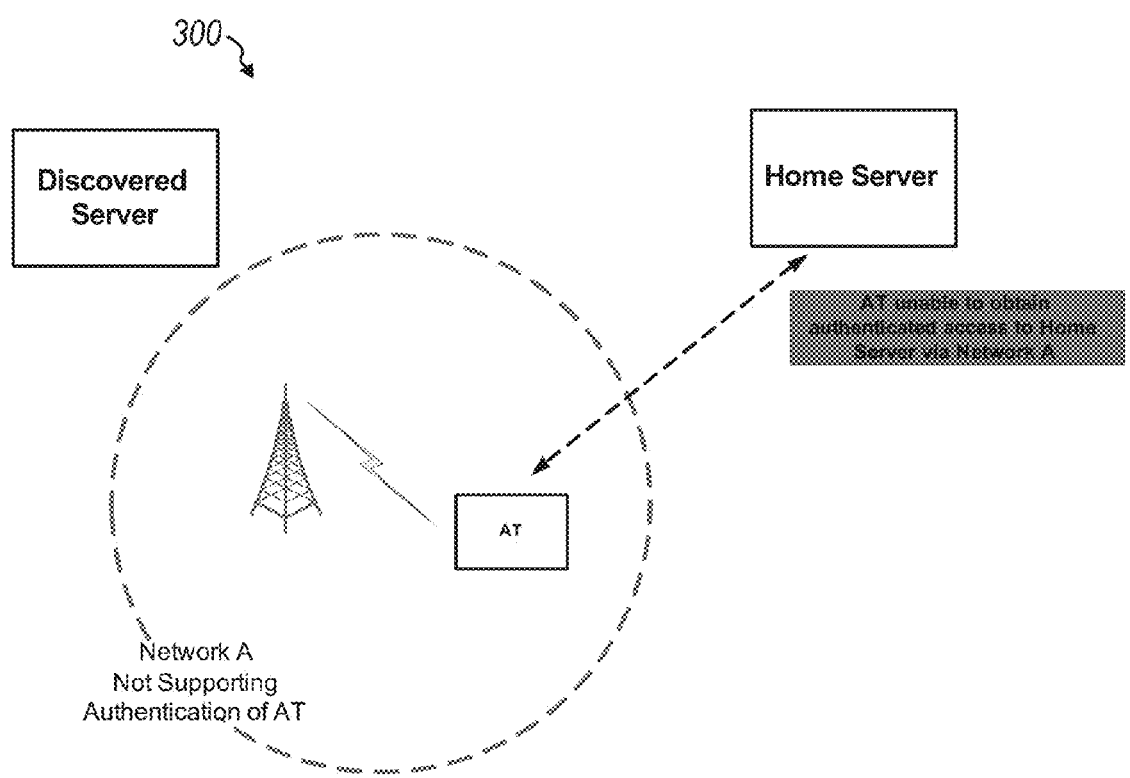
FIGS. 3A, 3B, and 3C are exemplary illustrations of steps associated with various embodiments.
Figure 3B:
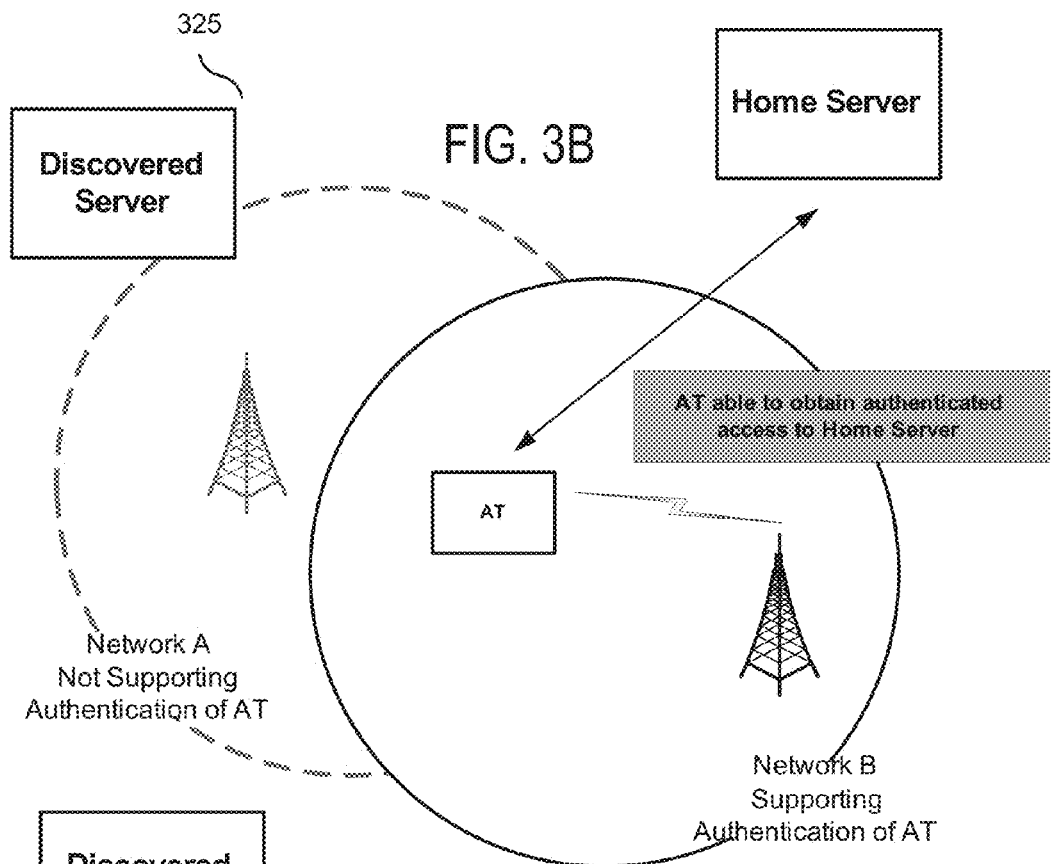
Figure 3C:
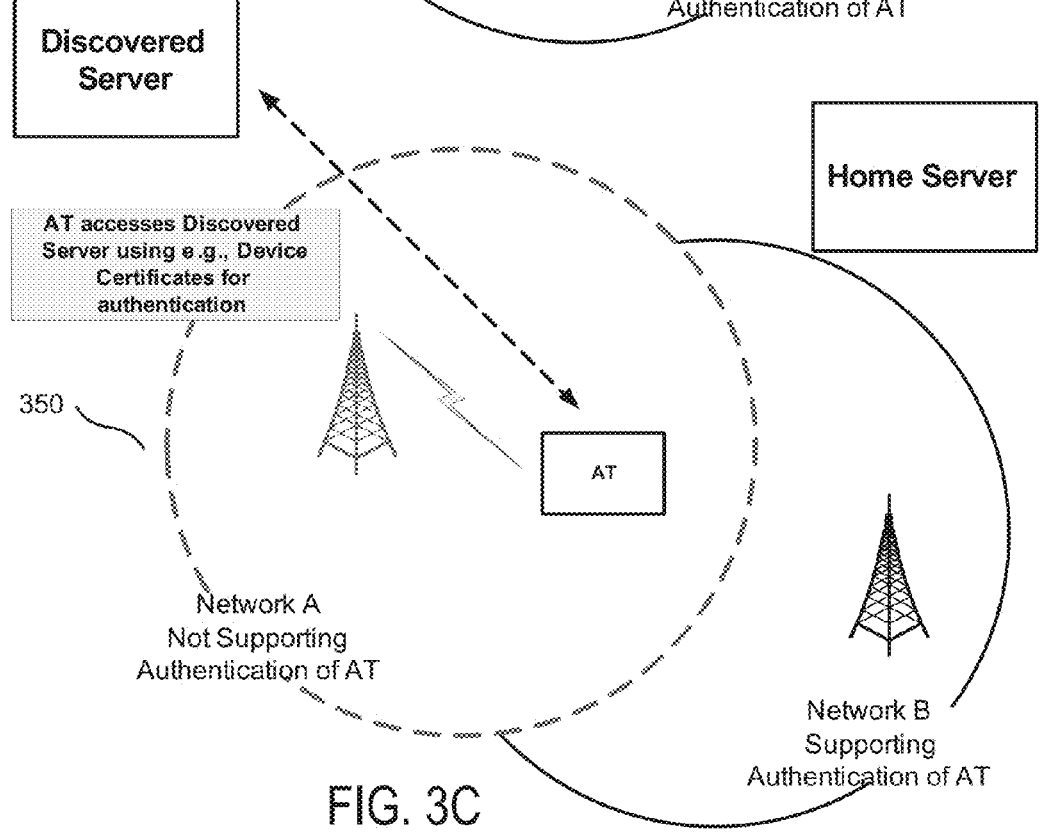

FIGS. 3A, 3B, and 3C illustrate the aforementioned mechanics according to some embodiments. With reference to these figures and subsequent figures and description, the terms "discovered location server" and "discovered server" are used synonymously, as are the terms "home location server" and "home server." Referring to FIG. 3A, example network scenario 300 shows an AT, for example the AT 116, within coverage of Network A. Here, the AT has discovered a discovered server but does not yet have authorized access to it. In this example, the AT is unable to access the discovered server to obtain support for location servers such as (i) obtaining assistance data from the discovered server to enable the AT to locate itself from measurements made by the AT of access points belonging to network A or (ii) having the discovered server locate the AT from measurements made by the AT and/or by network A of the AT. For example, the measurements may comprise timing and signal strength measurements for nearby base stations (e.g. AP 100), timing measurements for global navigation satellites, round trip time (RTT) measurements, received signal strength indicator (RSSI) measurements, assisted global navigation satellite system (GNSS) measurements, and the like. This inability to access the discovered server may occur because Network A does not support authentication means for the AT, and thus cannot signal to the discovered server any sufficient authentication information for the AT and thereby allow the discovered server to authenticate the AT (e.g. to enable subsequent billing of the AT or the home network of the AT for any location services provided to the AT by the discovered server). Further, the AT may be able to obtain such authentication information (to enable authentication of the AT by the discovered server) through its home server, but network A may provide no means to reach the home server or no means for the home server to authenticate the AT if the home server can be reached. In addition, even when the discovered server is able to authenticate the AT via network A or does not need to authenticate the AT (e.g. because location services are provided freely for access via network A), the AT may not be able to access the home server from network A to obtain authorization of the discovered server or may be able to access the home server via network A but be unable to authenticate the home server or unable to be authenticated by the home server. As previously discussed, such impediments may be due to various reasons, including network A having no access to a public network such as the Internet, the home network having no means to verify an IP address assigned by network A, restrictions on communication imposed by network A, the home network or intermediate entities, having too much traffic in network A, lacking proper network configurations to access the home server, or other impediments.

Referring to FIG. 3B, in some embodiments, continuing from the scenario first presented in FIG. 3A, the AT may then switch to a second network, network B, that enables authenticated access to the home server, as shown in example network scenario 325. The AT may then connect to the home server in an effort to ultimately connect to the discovered server found back in Network A. In the scenario exemplified in FIG. 3B, network B may enable one or more of the following capabilities: (i) access to the home server by the AT; (ii) authentication of the AT by the home server; (iii) authentication by the AT of the home server; (iv) discovery of the discovered server by the AT from the home server; (v) authorization of the discovered server by the home server including information that tells the AT under what circumstances (e.g. at which locations or from which networks) it may access the discovered server; (vi) provision of information from the home server to the AT to enable authentication of the AT by the discovered server; and (vii) provision of information by the home server to the AT to enable authentication of the discovered server by the AT. These enabled capabilities may not be supported by network A in the scenario shown in FIG. 3A, thereby initially preventing access by the AT to the discovered server.

Referring to FIG. 3C, continuing in this scenario, in some embodiments, the AT then switches back to Network A, now having made use of any of the capabilities (i), (ii), (iii), (iv), (v), (vi) and (vii) described above and possessing any information obtained as a consequence of these capabilities such as authentication or authorization information to access the discovered server. The AT may then access the discovered server via network A to obtain location services. Access to the discovered server via network A rather than network B may be preferred or even necessary—e.g. because the discovered server is on a private intranet not reachable from a public network such as network A or because the discovered server only provides location services in association with access from network A or because usage charges to the user of the AT when using network A are less than those when using network B. When the AT accesses the discovered server via network A, it may make use of information received from the home server via network B to (a) enable authentication of the AT by the discovered server (e.g. by making use of device certificates provided by the home server for this purpose), (b) enable authentication of the discovered server by the AT and/or (c) determine when the AT may and may not access the discovered server, for example.

Figure 4A:
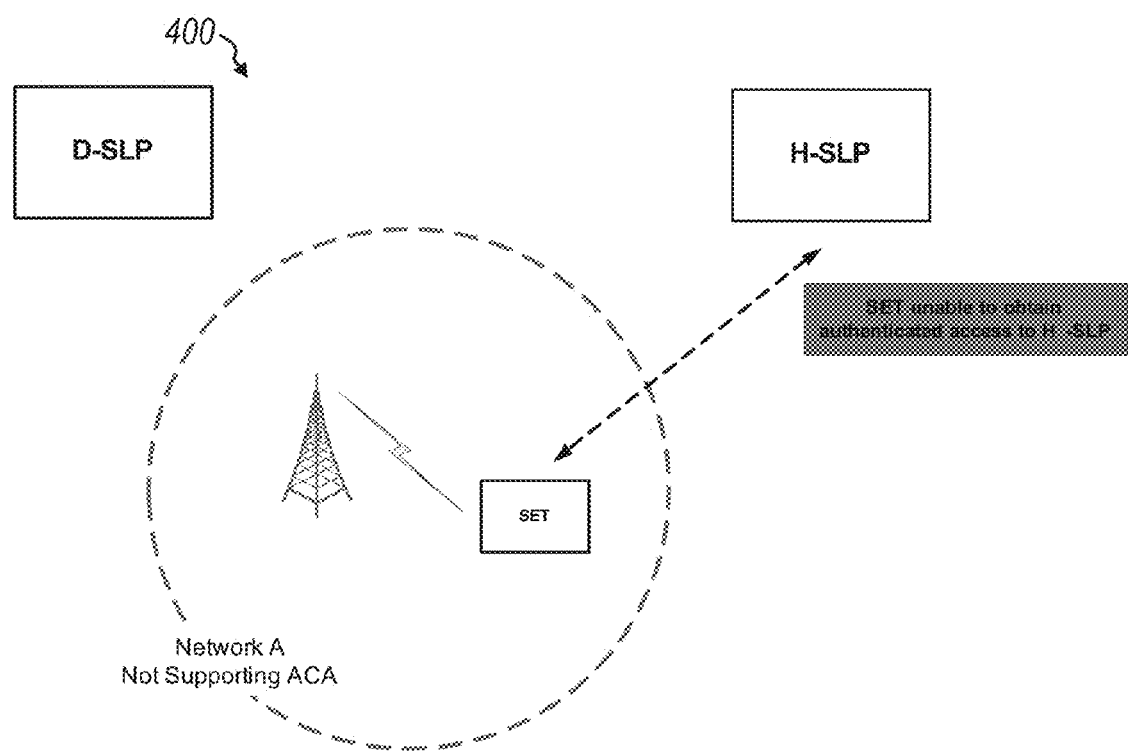
FIGS. 4A, 4B, and 4C are exemplary illustrations of steps associated with other various embodiments.
Figure 4B:
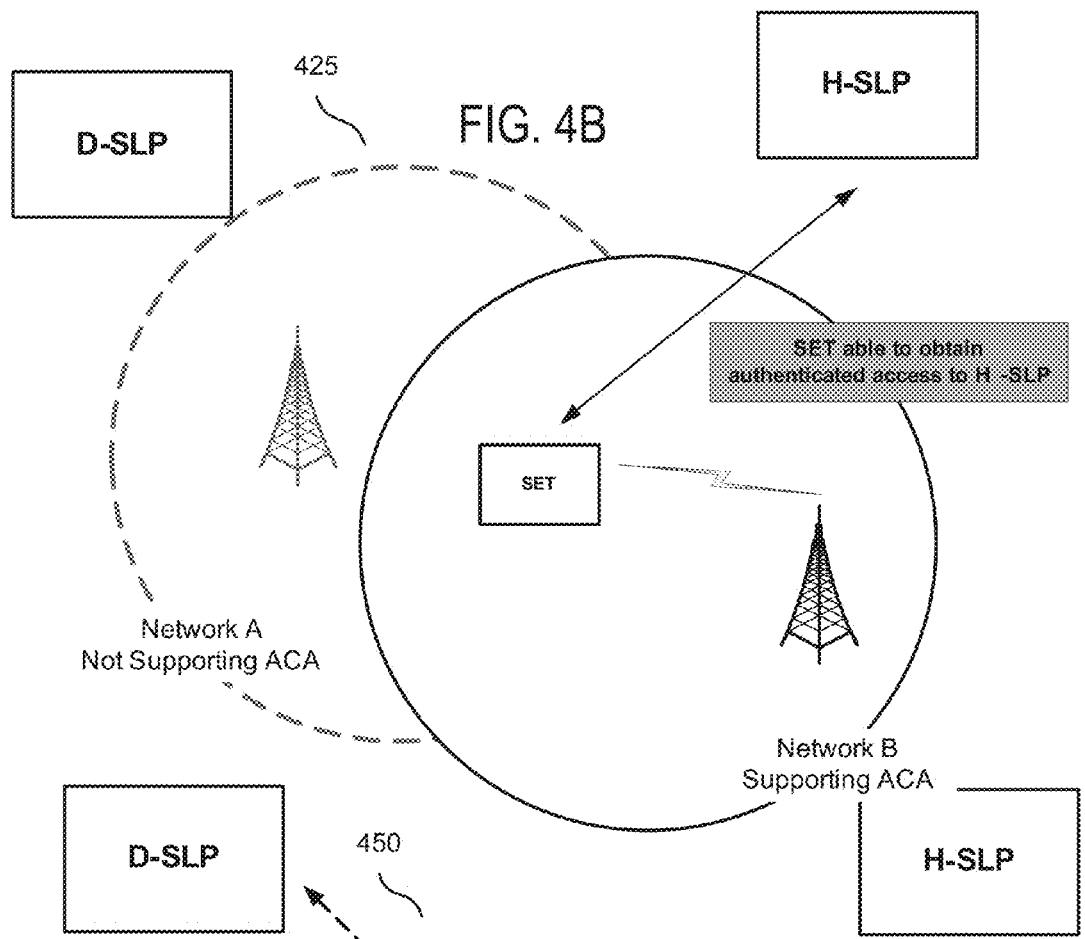
Figure 4C:
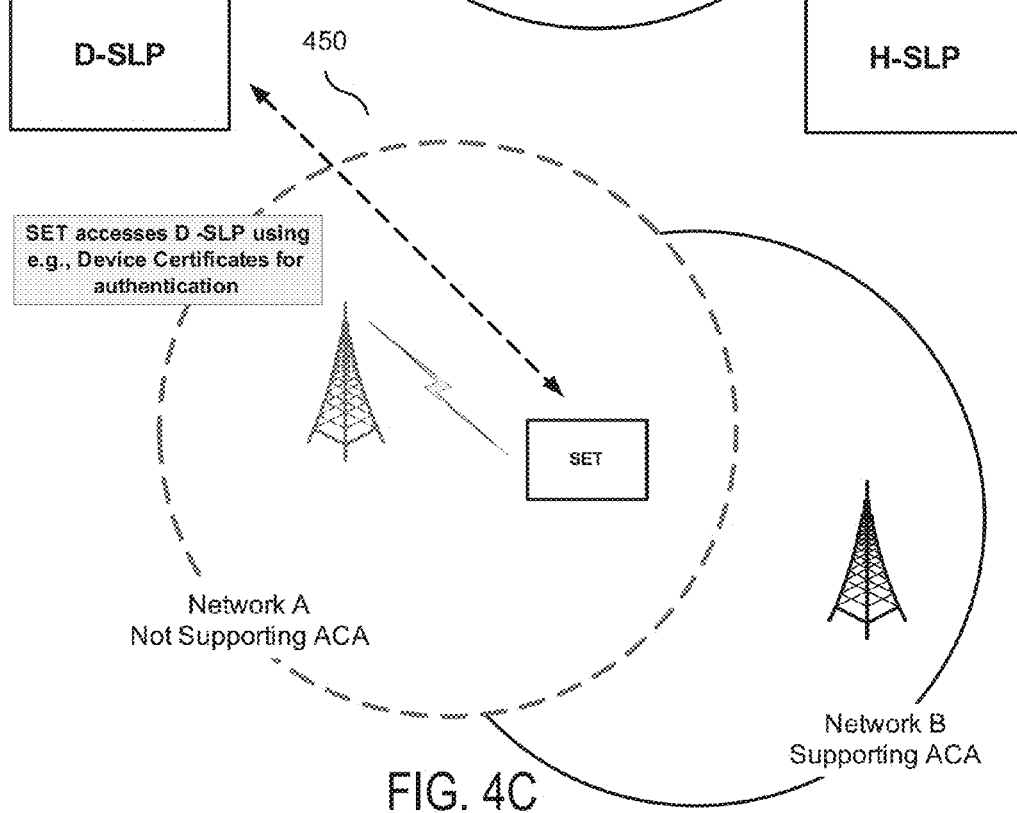

Referring to FIGS. 4A, 4B and 4C, a certain scenario is presented according to other embodiments. Referring to FIG. 4A, an example AT, for example the AT 116, may be a secure user plane location (SUPL) enabled terminal (SET), which may be within transmission range of Network A. Here in network scenario 400, the SET may have discovered an example type of discovered server, such as a discovered-SUPL location platform (D-SLP). However, the SET may be unable to access the D-SLP at first because the SET cannot obtain authorization for the D-SLP and/or authentication information for the D-SLP from the SET's home SLP (H-SLP) which the SET may trust to provide secure authorization and authentication related information for the D-SLP. As an example, Network A may not provide access to the SET's H-SLP or Network A may provide access but not support or enable authentication of the SET by the SET's H-SLP using a method such as the SUPL alternative client authentication (ACA) mechanism. Such impediments may be due to various reasons, including network A having no access to a public network such as the Internet, the home network having no means to verify an IP address assigned by network A, restrictions on communication imposed by network A, the home network or intermediate entities, having too much traffic in network A, lacking proper network configurations to access the H-SLP, or other impediments.

Referring to FIG. 4B, in some embodiments, continuing from the scenario first presented in FIG. 4A, the SET may then switch to a second network, Network B, that supports access to the H-SLP from the SET and authentication of the SET by the H-SLP using, in this example, the ACA authentication method, as shown in example network scenario 425. The SET may then connect to the H-SLP in an effort to ultimately connect to the D-SLP found back in Network A. In some embodiments, Network A could be a WLAN, and in some embodiments, Network B could be an LTE, WCDMA or HRPD network, for example. Certainly, Networks A and B could be various other kinds of networks. When the SET connects to the H-SLP via network B, the H-SLP may authenticate the SET using the ACA method or some other method defined by OMA for SUPL such as use of device certificates or use of the Generic Bootstrapping Architecture (GBA). In addition, the SET may authenticate the H-SLP using, for example, a public key certificate provided by the H-SLP. These methods of authentication may be possible using network B but not possible or limited in some way using network A. The H-SLP may then provide the address of the D-SLP to the SET, may authorize the D-SLP to the SET, and/or may provide information (a) informing the SET under which conditions the D-SLP may be accessed and/or (b) enabling authentication of the SET by the D-SLP or authentication of the D-SLP by the SET.

Referring to FIG. 4C, continuing in this scenario, in some embodiments, the SET then switches back to Network A, now possessing sufficient information and/or authorization from the H-SLP to access the D-SLP, in network scenario 450. The SET may then access the D-SLP via network A to obtain location services. Access to the D-SLP via network A rather than network B may be preferred or even necessary in some embodiments—e.g. because the D-SLP is on a private intranet not reachable from a public network or because the D-SLP only provides location services in association with access from network A or because usage charges to the user of the SET from network A are less than those for access from network B. When the SET accesses the D-SLP via network A, it may make use of information received from the H-SLP via network B to (a) enable authentication of the SET by the D-SLP (e.g. by making use of device certificates provided by the H-SLP for this purpose), (b) enable authentication of the D-SLP by the SET and/or (c) determine when the SET may and may not access the D-SLP, for example.

Figure 5A:
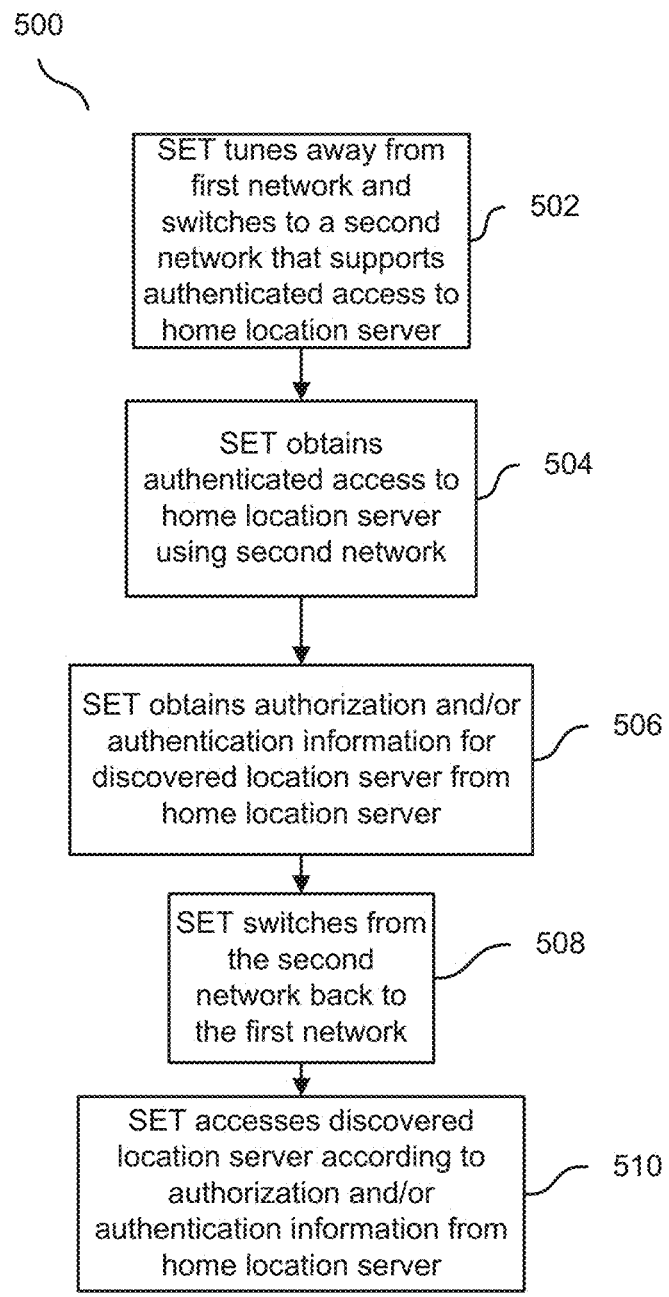
FIGS. 5A, 5B, and 5C illustrate exemplary flowcharts describing steps of various embodiments.

Referring to FIG. 5A, flowchart 500 describes various method steps according to some embodiments. These may be described in the following processes and may be consistent with the diagrams illustrated and described in any of FIGS. 1, 2, 3A, 3B, 3C, 4A, 4B, and 4C. A SET may need to access a discovered location server using a first network to obtain location services at its current location. The SET may be aware (e.g. from configuration information) that it needs authorization and/or authentication information to access the discovered location server from a home location server.

However, the SET may not be able to obtain authenticated access to the home location server from the first network and may therefore be unable to obtain the authorization and/or authentication information using the first network, for example for one or more reasons consistent with any of the rationales discussed in the disclosures herein. The first network could be any kind of digital network, and may be consistent with what is described as Network A in the preceding descriptions, for example.

At block 502, the SET may tune away from the first network and may then switch to a second network that supports authenticated access of the SET to the home location server. An example second network that may fit this description may be Network B according to the preceding descriptions. The SET may be implemented by the AT 116 and/or the system 250, for example. In such embodiments, block 502 may be performed, for example, by at least the transceiver 252.

At block 504, the SET may then obtain authenticated access to the home location server using the second network, for example with the processor 270 when the SET is implemented by the system 250. The home location server may be a H-SLP and may be consistent with the descriptions in FIGS. 3A, 3B, 3C, 4A, 4B, and 4C.

At block 506, the SET may then obtain authorization and/or authentication information for the discovered location server from the home location server, for example with the processor 270 when the SET is implemented by the system 250. Recall that the authorization from the home location server may be occurring while using the second network. The discovered location server may be a D-SLP and may be consistent with the descriptions in FIGS. 3A, 3B, 3C, 4A, 4B, and 4C.

At block 508, the SET may then switch from the second network back to the first network, for example with the transceiver 252 when the SET is implemented by the system 250. At this point, the SET may have obtained authorization for the discovered location server. At block 510, the SET may then access the discovered location server using the authentication obtained from the home location server while using the second network, for example with the processor 270 when the SET is implemented by the system 250.

Figure 5B:
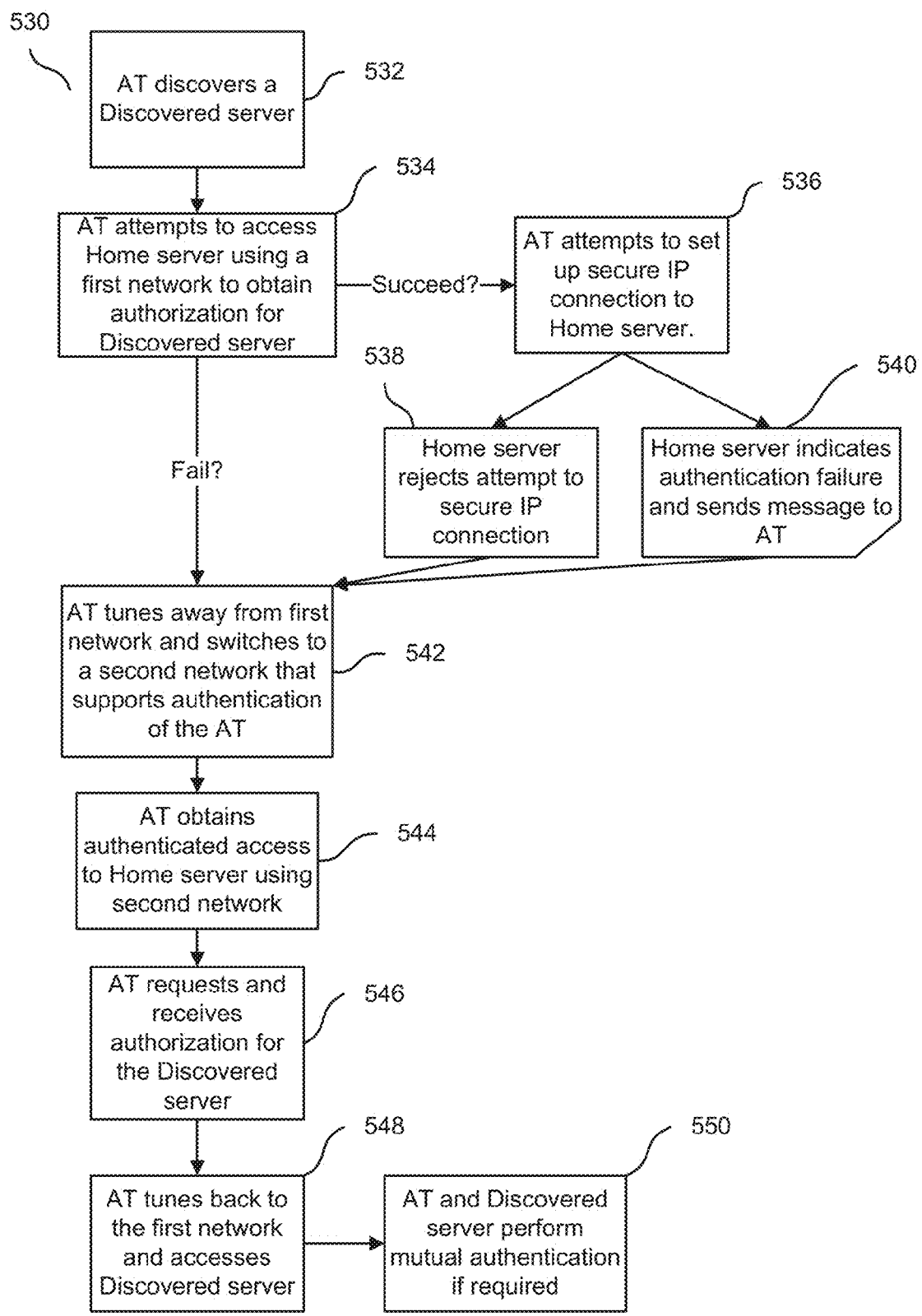

Referring to FIG. 5B, flowchart 530 may represent an alternative collection of method steps according to other embodiments. These descriptions may be consistent with any of the descriptions in FIGS. 1, 2, 3A, 3B, 3C, 4A, 4B, and 4C.

At block 532, in some embodiments, an AT may use a WLAN and discovers a discovered server (e.g. discovers the address of a previously unknown server being broadcast from the WLAN). The AT used in this example may be consistent with the AT 116 and/or the system 250, for example. In such embodiments, 532 may be performed, for example, by at least the transceiver 252.

At block 534, the AT needs authorization for the discovered server from the home server and attempts to access the home server using a first network (e.g. a WLAN). If the AT cannot access the home server, for example, because the WLAN does not have access to a public network, the AT proceeds to block 542. Block 534 may be performed, for example, by at least transceiver 252 and processor 270.

However, if the AT does succeed in accessing the home server, at block 536, the AT then attempts to set up a secure IP connection to the home server, using for example, Tx data processor 238 through transceiver 252. At this point, one of two events may happen that are relevant to the present disclosures. At block 538, the home server may reject the attempt to secure the IP connection. The rejection may be due to various reasons, including experiencing an intermittent failed connection, or lacking proper authentication means while at the first network, or other reasons. Alternatively or in addition, at block 540, the home server may indicate an authentication failure and send a message indicating the same to the AT. The AT may receive such indications at transceiver 252. For example, the home server may be unable to verify the IP address of the AT provided by the first network, and so authentication may fail.

From any of blocks 534, 538, or 540, at block 542, after being unable ultimately to access the home server, the AT tunes away from the first network and switches to a second network that supports access to the home server and authentication of the AT by the home server, e.g. using transceiver 252. For example, while in the second network, the AT may obtain an IP address that the home server may ultimately recognize as assigned to a known global identity belonging to the AT. At block 544, the AT then obtains authenticated access to the home server using the second network. Block 544 may be implemented, for example, by at least processor 270 and transceiver 252.

At block 546, using for example, transceiver 252, the AT requests and receives authorization for the discovered server and may also receive information to enable authenticated access to the discovered server. The AT may now have sufficient authorization and possibly sufficient authentication information for the discovered server using the authenticated access obtained at the second network from the home server. At block 548, the AT then tunes away from the second network and back to the first network, for example with the transceiver 252 and/or the processor 270, in order to access the discovered server—for example, because the discovered server cannot be accessed from the second network or because the second network provides lower access charges to the user of the AT. The AT then obtains access to the discovered server, now being in the proper network and possessing sufficient authorization and optionally authentication information to access the discovered server. In some embodiments, at block 550, the AT and discovered server may use device certificates to perform mutual authentication with the device certificates possibly provided to the AT by the home server as part of block 546. Alternatively, the discovered server may not authenticate the AT because discovered server access may be restricted to the first network and the discovered server may provide free location services to any AT using the first network.

Now having access to the discovered server, the AT may obtain location services from the discovered server, e.g. may obtain location assistance data, local map data, computation of its location.

Figure 5C:
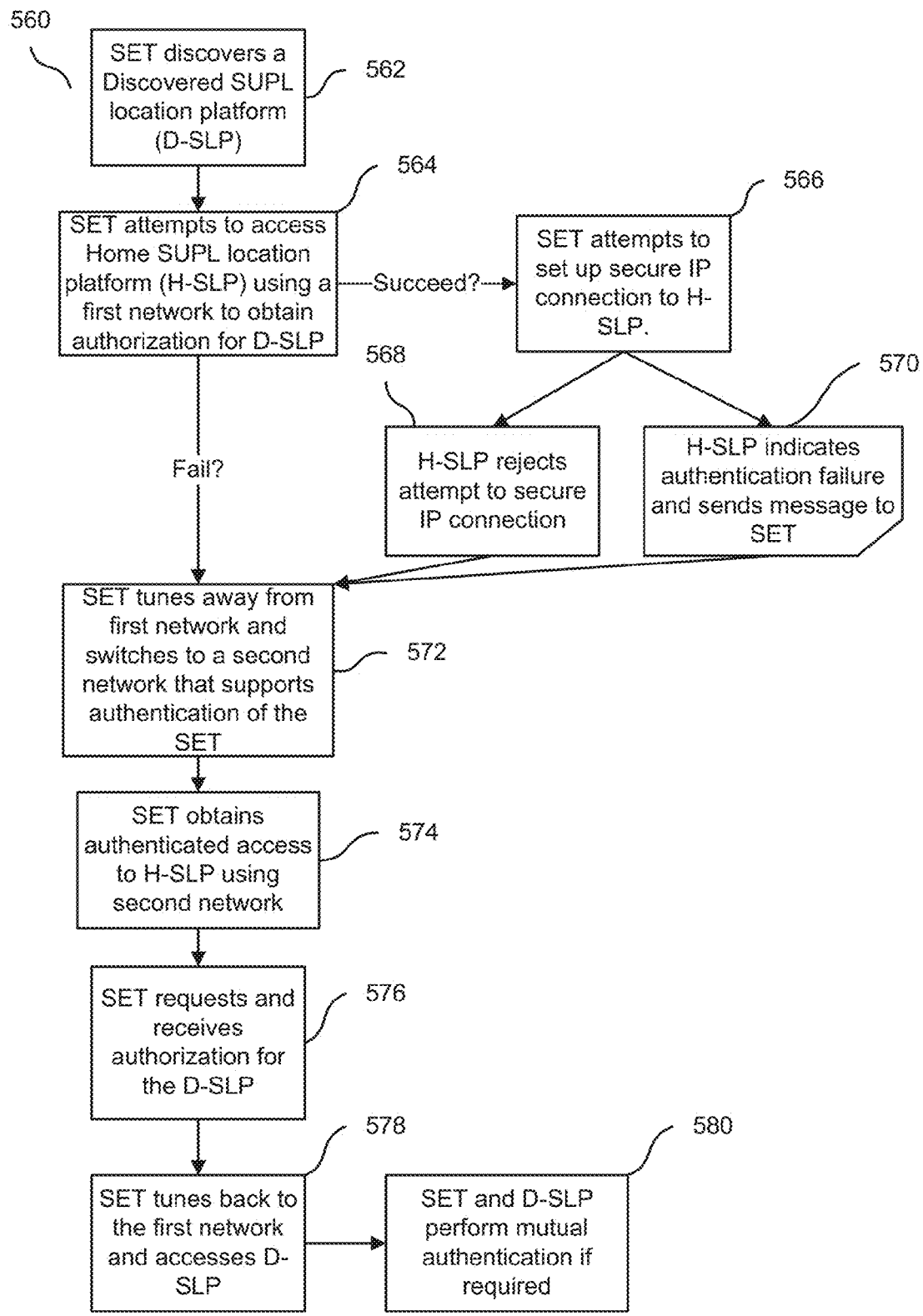

Referring to FIG. 5C, flowchart 560 may represent an alternative collection of methods steps according to other embodiments. These descriptions may be consistent with any of the descriptions in FIGS. 1, 2, 3A, 3B, 3C, 4A, 4B, and 4C. Flowchart 560 may provide an example implementation of FIG. 5B.

At block 562, in some embodiments, a SET may use a WLAN and discovers a Discovered SUPL location platform (D-SLP) (e.g. discovers the address of a previously unknown SLP being broadcast from the WLAN). The SET used in this example may be consistent with the AT 116 and/or the system 250, for example. In such embodiments, block 562 may be performed, for example, by at least the transceiver 252.

At block 564, the SET needs authorization for the D-SLP from a home SUPL location platform (H-SLP) and attempts to access the H-SLP using a first network which may be the WLAN used to discover the D-SLP. If the SET cannot access the H-SLP, for example, because the first network does not have access to a public network, the SET proceeds to block 572. Block 564 may be performed, for example, by at least transceiver 252 and processor 270.

However, if the SET does succeed in accessing the H-SLP, at block 566, the SET then attempts to set up a secure IP connection to the H-SLP, using for example, Tx data processor 238 through transceiver 252. At this point, one of two events may happen in the illustrated example. At block 568, the H-SLP may reject the attempt to secure the IP connection. The rejection may be due to various reasons, including experiencing an intermittent failed connection, or lacking proper authentication means while at the first network, or other reasons. Alternatively or in addition to, at block 570, the H-SLP may indicate an authentication failure and sends a message indicating the same to the SET. The SET may receive such indications at transceiver 252. For example, the H-SLP may be unable to verify the IP address provided by the first network, and so authentication may fail. In some embodiments, the H-SLP attempts to authenticate the SET using the ACA method but cannot verify the SET IP address (which was assigned by the WLAN). The H-SLP either rejects the attempt to set up a secure IP connection, at block 568, or indicates ACA authentication failure to the SET—e.g. by sending a SUPL END message with appropriate error code, at block 570.

From any of blocks 564, 568, or 570, at block 572, after being unable ultimately to access the H-SLP, the SET tunes away from the first network and switches to a second network that supports authentication of the SET by the H-SLP, e.g. using transceiver 252. In some embodiments, the second network supports LTE. In some embodiments, the second network may support WCDMA, GSM or cdma2000 HRPD. For example, while in the second network, the SET may obtain an IP address that the H-SLP may ultimately recognize as assigned to the SET via association of the IP address with a known global identity for the SET such as an MSDISDN or IMSI. At block 574, the SET then obtains authenticated access to the H-SLP using the second network. Block 574 may be implemented, for example, by at least processor 270 and transceiver 252.

At block 576, the SET requests and receives, using for example transceiver 252, authorization for the D-SLP from the H-SLP and may also receive information to enable authentication of the SET by the D-SLP or of the D-SLP by the SET. The SET may now have sufficient authorization and possibly authentication information to enable access to the D-SLP using the authorization and possibly authentication information obtained at the second network from the H-SLP. At block 578, the SET then tunes away from the second network and back to the first network, for example with the transceiver 252 and/or the processor 270, in order to access the D-SLP—for example, because the D-SLP cannot be accessed from the second network or because the second network provides lower access charges to the user of the SET. The SET obtains access to the D-SLP, now being in the proper network and possessing sufficient authorization and possibly authentication information to access the D-SLP. In some embodiments, at block 580, the SET and D-SLP may use device certificates to perform mutual authentication—e.g. with the device certificates provided to the SET by the H-SLP as part of block 576. For example, the mutual authentication may be consistent with SUPL 2.1 or SUPL 3.0 as defined by OMA. Alternatively, the D-SLP may not authenticate the SET because D-SLP access may be restricted to the first network and the D-SLP may provide free location services to any SET using the first network.

Now having access to the D-SLP, the SET may obtain location services from the D-SLP, e.g. to obtain location assistance data, local map data, computation of its location.

The previous figures and flowcharts provide embodiments in which an AT is unable to obtain authorization and possibly authentication information to enable access to a discovered location server using a first network and tunes away to a second network in order to obtain authenticated access to a home location server that is able to authorize the discovered location server and, if needed, provide information to allow subsequent authenticated access by the AT to the discovered location server. The AT then tunes back to the first network in order to access the discovered location server. In some embodiments, the AT may not need to or may prefer not to tune back to the first network and may instead access the discovered location server using the second network or using some other third network different to the first and second networks. In some scenarios, such embodiments may reduce delay in accessing the discovered location server and may enable improved authentication either of the AT by the discovered location server or of the discovered location server by the AT than is possible when the AT accesses the discovered location server using the first network.

Figure 6:
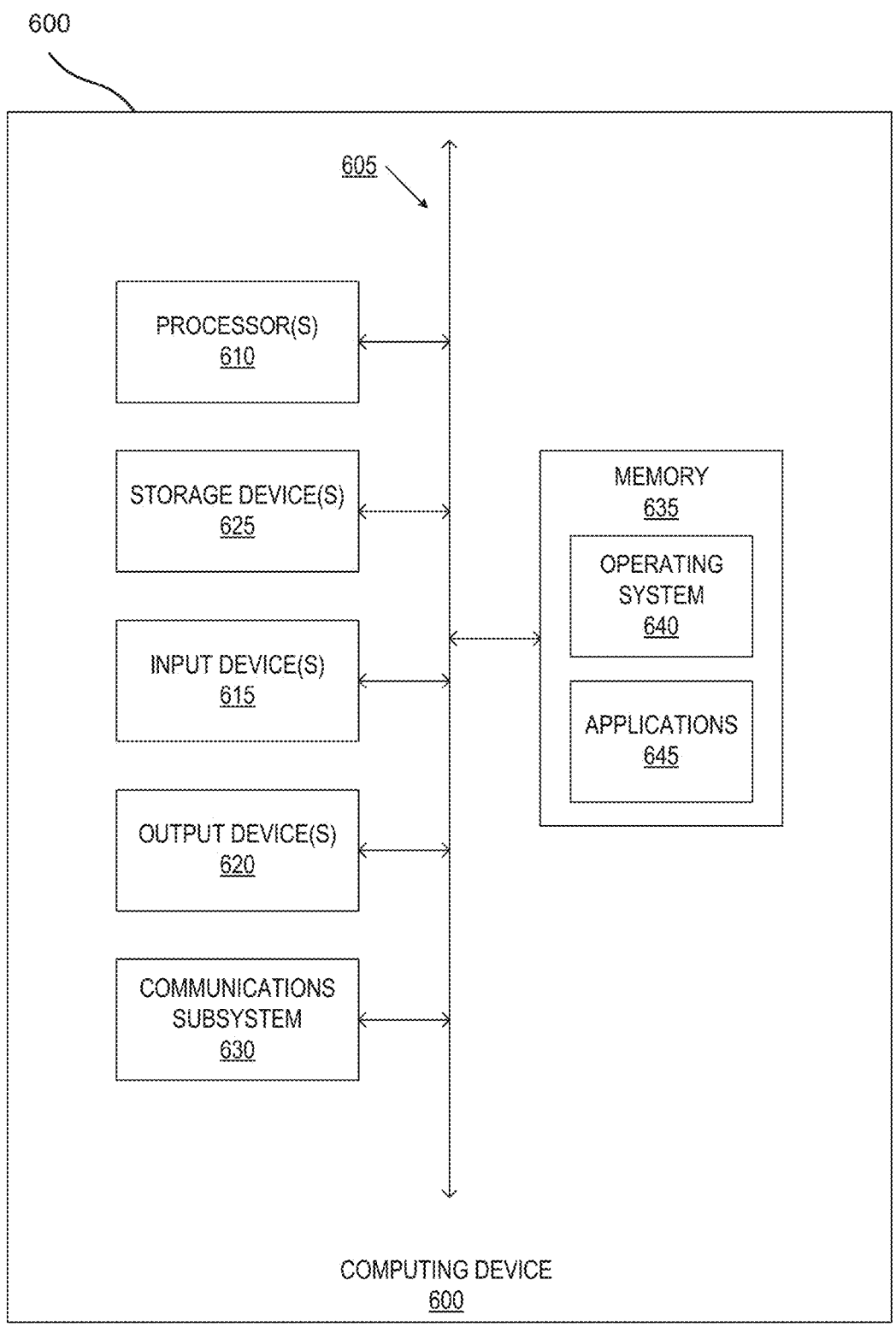
FIG. 6 is an exemplary computer system of various embodiments.

Having described multiple aspects above, an example of a computing system in which such aspects may be implemented may now be described with respect to FIG. 6. According to one or more aspects, a computer system as illustrated in FIG. 6 may be incorporated as part of a computing device, which may implement, perform, and/or execute any and/or all of the features, methods, and/or method steps described herein. For example, one or more of the processor 610, memory 635, and communications subsystems 630 may be used to implement any or all of the blocks as shown in FIGS. 5A, 5B, and 5C. For example, computer system 600 may represent some of the components of a hand-held device. A hand-held device may be any computing device with an input sensory unit, such as a camera and/or a display unit. Examples of a hand-held device include but are not limited to video game consoles, tablets, smart phones, and mobile devices. In some embodiments, the system 600 is configured to implement the device 250 described above. For example, processor 610 may be used to implement some or all of Rx data processor 260, processor 270, and Tx data processor 238. Input device(s) 615 may be used to implement some or all of transceivers 252(*a*)-(*r*). Memory 635 may be used to implement memory 272, and communications subsystem 630 may be used to implement modulator 280. FIG. 6 provides a schematic illustration of one embodiment of a computer system 600 that can perform the methods provided by various other embodiments, as described herein, and/or can function as the host computer system, a remote kiosk/terminal, a point-of-sale device, a mobile device, a set-top box, and/or a computer system. FIG. 6 is meant only to provide a generalized illustration of various components, any and/or all of which may be utilized as appropriate. FIG. 6, therefore, broadly illustrates how individual system elements may be implemented in a relatively separated or relatively more integrated manner.

The computer system 600 is shown comprising hardware elements that can be electrically coupled via a bus 605 (or may otherwise be in communication, as appropriate). The hardware elements may include one or more processors 610, including without limitation one or more general-purpose processors and/or one or more special-purpose processors (such as digital signal processing chips, graphics acceleration processors, and/or the like); one or more input devices 615, which can include without limitation a camera, a mouse, a keyboard and/or the like; and one or more output devices 620, which can include without limitation a display unit, a printer and/or the like.

The computer system 600 may further include (and/or be in communication with) one or more non-transitory storage devices 625, which can comprise, without limitation, local and/or network accessible storage, and/or can include, without limitation, a disk drive, a drive array, an optical storage device, a solid-state storage device such as a random access memory ("RAM") and/or a read-only memory ("ROM"), which can be programmable, flash-updateable and/or the like. Such storage devices may be configured to implement any appropriate data storage, including without limitation, various file systems, database structures, and/or the like.

The computer system 600 might also include a communications subsystem 630, which can include without limitation a modem, a network card (wireless or wired), an infrared communication device, a wireless communication device and/or chipset (such as a Bluetooth® device, an 802.11 device, a WiFi device, a WiMax device, cellular communication facilities, etc.), and/or the like. The communications subsystem 630 may permit data to be exchanged with a network (such as the network described below, to name one example), other computer systems, and/or any other devices described herein. In many embodiments, the computer system 600 may further comprise a non-transitory working memory 635, which can include a RAM or ROM device, as described above.

The computer system 600 also can comprise software elements, shown as being currently located within the working memory 635, including an operating system 640, device drivers, executable libraries, and/or other code, such as one or more application programs 645, which may comprise computer programs provided by various embodiments, and/or may be designed to implement methods, and/or configure systems, provided by other embodiments, as described herein. Merely by way of example, one or more procedures described with respect to the method(s) discussed above, for example as described with respect to FIGS. 5A, 5B, or 5C, might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a computer-readable storage medium, such as the storage device(s) 625 described above. In some cases, the storage medium might be incorporated within a computer system, such as computer system 600. In other embodiments, the storage medium might be separate from a computer system (e.g., a removable medium, such as a compact disc), and/or provided in an installation package, such that the storage medium can be used to program, configure and/or adapt a general purpose computer with the instructions/code stored thereon. These instructions might take the form of executable code, which is executable by the computer system 600 and/or might take the form of source and/or installable code, which, upon compilation and/or installation on the computer system 600 (e.g., using any of a variety of generally available compilers, installation programs, compression/decompression utilities, etc.) then takes the form of executable code.

Substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

Some embodiments may employ a computer system (such as the computer system 600) to perform methods in accordance with the disclosure. For example, some or all of the procedures of the described methods may be performed by the computer system 600 in response to processor 610 executing one or more sequences of one or more instructions (which might be incorporated into the operating system 640 and/or other code, such as an application program 645) contained in the working memory 635. Such instructions may be read into the working memory 635 from another computer-readable medium, such as one or more of the storage device(s) 625. Merely by way of example, execution of the sequences of instructions contained in the working memory 635 might cause the processor(s) 610 to perform one or more procedures of the methods described herein, for example one or more of the elements of the method described with respect to any of FIGS. 5A, 5B, or 5C.

The terms "machine-readable medium" and "computer-readable medium," as used herein, refer to any medium that participates in providing data that causes a machine to operate in a specific fashion. In an embodiment implemented using the computer system 600, various computer-readable media might be involved in providing instructions/code to processor(s) 610 for execution and/or might be used to store and/or carry such instructions/code (e.g., as signals). In many implementations, a computer-readable medium is a physical and/or tangible storage medium. Such a medium may take many forms, including but not limited to, non-volatile media, volatile media, and transmission media. Non-volatile media include, for example, optical and/or magnetic disks, such as the storage device(s) 625. Volatile media include, without limitation, dynamic memory, such as the working memory 635. Transmission media include, without limitation, coaxial cables, copper wire and fiber optics, including the wires that comprise the bus 605, as well as the various components of the communications subsystem 630 (and/or the media by which the communications subsystem 630 provides communication with other devices). Hence, transmission media can also take the form of waves (including without limitation radio, acoustic and/or light waves, such as those generated during radio-wave and infrared data communications).

In one or more examples, the functions described may be implemented in hardware, software, firmware, or any combination thereof. If implemented in software, the functions may be stored on or transmitted over as one or more instructions or code on a computer-readable medium. Computer-readable media may include computer data storage media. Data storage media may be any available media that can be accessed by one or more computers or one or more processors to retrieve instructions, code and/or data structures for implementation of the techniques described in this disclosure. "Data storage media" as used herein refers to manufactures and does not refer to transitory propagating signals. By way of example, and not limitation, such computer-readable media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The code may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware stored on computer-readable media.

Various examples have been described. These and other examples are within the scope of the following claims.

What is claimed is:

1. A method for use in a terminal to access a discovered location server, the method comprising:
   in response to a determination that a first network does not support authenticated access to a home location server by the terminal, obtaining, by the terminal authenticated access to the home location server using a second network that does support authenticated access to the home location server by the terminal;
   obtaining, by the terminal, authorization for the discovered location server from the home location server using the authenticated access;
   accessing, by the terminal, the discovered location server using the first network according to the obtained authorization, wherein:
      the terminal comprises a secure user plane location (SUPL) enabled terminal (SET);
      the discovered location server comprises a discovered SUPL location platform (D-SLP); and
      the home location server comprises a home SUPL location platform (H-SLP).

2. The method of claim 1, wherein the authenticated access obtained from the home location server is based, at least in part, via an alternative client authentication (ACA) mechanism, a device certificate, a Generic Bootstrapping Architecture (GBA), a public key certificate, or some combination thereof.

3. The method of claim 1, wherein the first network is a wireless local area network (WLAN).

4. The method of claim 1, wherein the second network supports Long Term Evolution (LTE), WCDMA, GSM, cdma2000 HRPD, or a combination thereof.

5. A terminal for accessing a discovered location server, the terminal comprising:
   a processor configured to:
      in response to a determination that a first network does not support authenticated accesses to a home location server by the terminal, obtain authenticated access to the home location server using a second network that does support authenticated access to the home location server by the terminal;
      obtain authorization for the discovered location server from the home location server using the authenticated access; and
      access the discovered location server using the first network according to the obtained authorization, wherein:
         the terminal comprises a secure user plane location (SUPL) enabled terminal (SET);
         the discovered location server comprises a discovered SUPL location platform (D-SLP); and
         the home location server comprises a home SUPL location platform (H-SLP).

6. The terminal of claim 5, wherein the authenticated access obtained from the home location server is based, at least in part, via an authentication (ACA) mechanism, a device certificate, a Generic Bootstrapping Architecture (GBA), a public key certificate, or some combination thereof.

7. The terminal of claim 5, wherein the first network is a wireless local area network (WLAN).

8. The terminal of claim 5, wherein the second network supports Long Term Evolution (LTE), WCDMA, GSM, cdma2000 HRPD, or a combination thereof.

9. An apparatus for accessing a discovered location server, the apparatus comprising:
   means for, in response to a determination that a first network does not support authenticated access to a home location server by a terminal, obtaining authenticated access to the home location server using a second network that does support authenticated access to the home location server by the terminal;
   means for obtaining authorization for the discovered location server from the home location server using the authenticated access; and
   means for accessing the discovered location server using the first network according to the obtained authorization, wherein:
      the terminal comprises a secure user plane location (SUPL) enabled terminal (SET);
      the discovered location server comprises a discovered SUPL location platform (D-SLP); and
      the home location server comprises a home SUPL location platform (H-SLP).

10. The apparatus of claim 9, wherein the authenticated access obtained from the home location server is based, at least in part, via an alternative client authentication (ACA) mechanism, a device certificate, a Generic Bootstrapping Architecture (GBA), a public key certificate, or some combination thereof.

11. The apparatus of claim 9, wherein the first network is a wireless local area network (WLAN).

12. The apparatus of claim 9, wherein the second network supports Long Term Evolution (LTE), WCDMA, GSM, cdma2000 HRPD, or a combination thereof.

13. A non-transitory processor-readable medium comprising processor-readable instructions configured to cause a processor to:
   in response to a determination that a first network does not support authenticated access to a home location server by a terminal, obtain authenticated access to the home location server using a second network that does support authenticated access to the home location server by the terminal;
   obtain authorization for the discovered location server from the home location server using the authenticated access; and
   access the discovered location server using the first network according to the obtained authorization, wherein:
      the terminal comprises a secure user place location (SUPL) enabled terminal (SET);
      the discovered location server comprises a discovered SUPL location platform (D-SLP); and
      the home location server comprises a home SUPL location platform (H-SLP).

14. The non-transitory processor-readable medium of claim 13, wherein authenticated access obtained from the H-SLP is based, at least in part, via an alternative client authentication (ACA) mechanism, a device certificate, a Generic Bootstrapping Architecture (GBA), a public key certificate, or some combination thereof.

15. The non-transitory processor-readable medium of claim 13, wherein the first network is a wireless local area network (WLAN).

16. The non-transitory processor-readable medium of claim 13, wherein the second network is a network that supports Long Term Evolution (LTE), WCDMA, GSM, cdma2000 HRPD, or a combination thereof.

* * * * *